May 6, 1969  B. BARNETT ET AL  3,442,479
MOUNTING MEANS

Filed Jan. 24, 1968

INVENTORS.
BURTON BARNETT
ROBERT J. PIETKA
BY GEORGE M. MOISSON, JR.

Richard D. Seibel
ATTORNEY

May 6, 1969  B. BARNETT ET AL  3,442,479
MOUNTING MEANS
Filed Jan. 24, 1968  Sheet 2 of 2

INVENTORS.
BURTON BARNETT
ROBERT J. PIETKA
BY GEORGE M. MOISSON, JR.

Richard D. Seibel
ATTORNEY

United States Patent Office 3,442,479
Patented May 6, 1969

3,442,479
MOUNTING MEANS
Burton Barnett, Los Alamitos, George M. Moisson, Jr., Palos Verdes, and Robert J. Pietka, Placentia, Calif., assignors to North American Rockwell Corporation
Filed Jan. 24, 1968, Ser. No. 700,179
Int. Cl. F16f *15/04;* F16m *1/02*
U.S. Cl. 248—358     7 Claims

ABSTRACT OF THE DISCLOSURE

A ceramic central diffuser for a jet engine exhaust is mounted on four metal tubes extending between the diffuser and opposite walls of the jet engine. A resilient mount is provided between each of the tubes and the ceramic diffuser for accommodating thermal expansion differences and minimizing vibration transfer. Each of the tubes extends through a wall of the hollow diffuser and has a pair of ring-like retainers secured thereto on each side of the aperture through the diffuser wall. Each of the ring-like retainers has an internally rebated shoulder mating with a sliding sleeve of substantially the same size as the aperture. A layer of stainless steel felt between the sliding sleeve and the tube resiliently accommodates thermal expansion differences and provides a rigid mount for the diffuser with minimized vibration transfer. The sleeve provides a locus for sliding motion and also affords protection for the felt from surrounding gases.

Background

Mounting of ceramic members and the like with metal supports has continued to be a problem because of substantial differences in coefficient of thermal expansion as well as the relatively lower strength of many ceramics. The expansion differences lead to high stresses in rigid mountings when large temperature differences and thermal cycling are encountered. Such mounting problems become particularly acute in the high stress, high vibration, high temperature environment of a jet engine. It is therefore desirable to provide a mounting means for resiliently accommodating differences in thermal expansion. It should also be apparent that such mounting means can also accommodate other types of dimensional changes, misalignments and the like.

Brief summary of the invention

Therefore, in practice of this invention according to a preferred embodiment, there is provided means for mounting structures having different expansion characteristics comprising two members, one of said members passing through a portion of the other member. Between the two members elastic compression means are provided for resiliently accommodating expansion differences in one direction, and sliding means are provided for yieldingly accommodating expansion differences in a second direction. It is particularly preferred to employ an elongated member extending through an aperture in the second member and provide first and second retainers on opposite sides of the aperture for containing the resilient and sliding supports. The resilient support is preferably a metal felt-like material around the elongated member and the sliding means is preferably a sleeve slidably fitted in the aperture and surrounding the felt-like material.

Many of the attendant advantages of this invention will be readily appreciated as the same becomes better understood by reference to the following detailed description when considered in connection with the accompanying drawings wherein.

Throughout the drawings like numerals refer to like parts.

Figure 1:
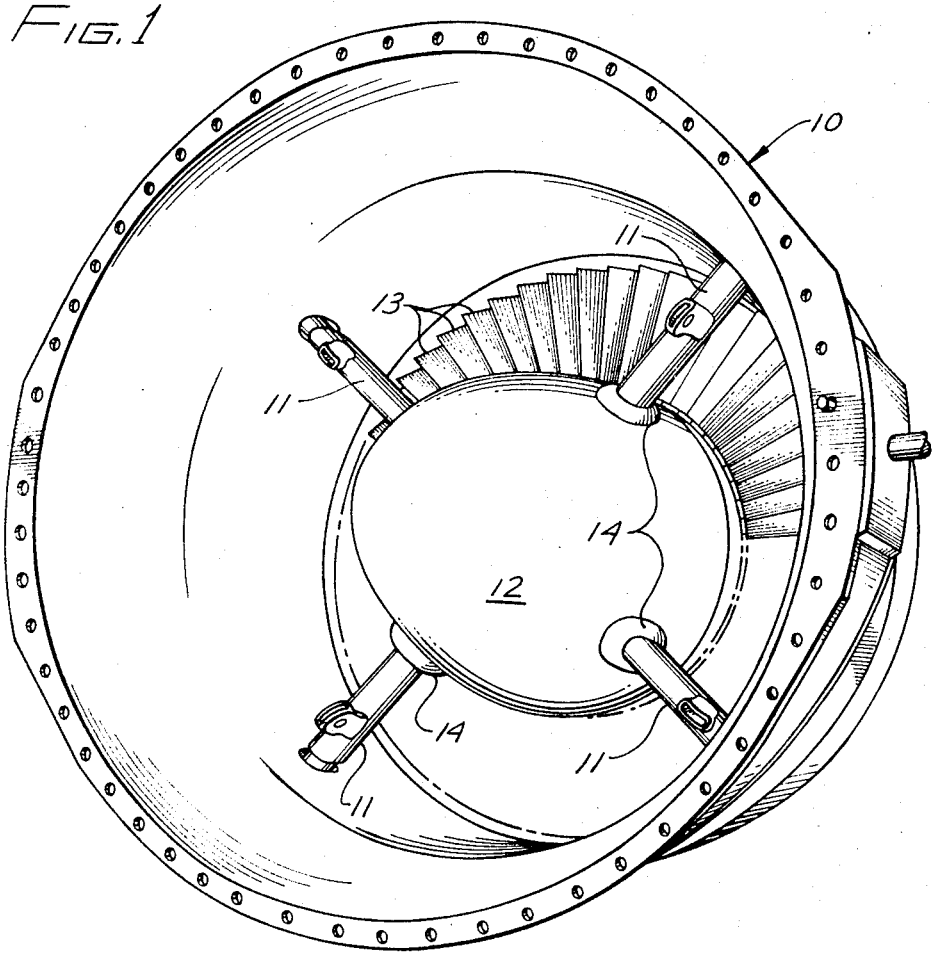
FIG. 1 illustrates a jet engine exhaust having a ceramic center diffuser therein.

FIG. 1 illustrates, in perspective, the exhaust portion of a jet aircraft engine incorporating the principles of this invention. As illustrated in this embodiment there is provided an engine housing 10 having four inwardly extending tubes 11 for supporting a ceramic central diffuser 12. The diffuser 12 comprises a bullet-shaped member mounted in the jet engine exhaust aft of the last turbine stage 13. The changing cross section of the diffuser covering the hub (not shown) of the last stage, along with the flare of the engine housing 10 provides the proper expansion chamber for the engine exhaust gases for optimum thrust from the jet engine.

A jet engine exhaust is a severe environment for a ceramic diffuser involving elevated temperatures, high stresses, and substantial vibrations. In order to accommodate these conditions special mounting means are provided for the diffuser. The four metal tubes 11 extending from the engine housing 10 collectively limit motion of the diffuser in any direction. It will be apparent that three or more such mounting tubes provides firm mechanical support for the ceramic diffuser. Each of the tubes is connected to the diffuser by mounting means providing resilient and limited sliding accommodation of thermal expansion differences. Retainer rings 14 of the mountings are seen in FIG. 1, however, the internal structure of the mounting couplings is better illustrated in the cross section of FIGURE 2.

Figure 2:
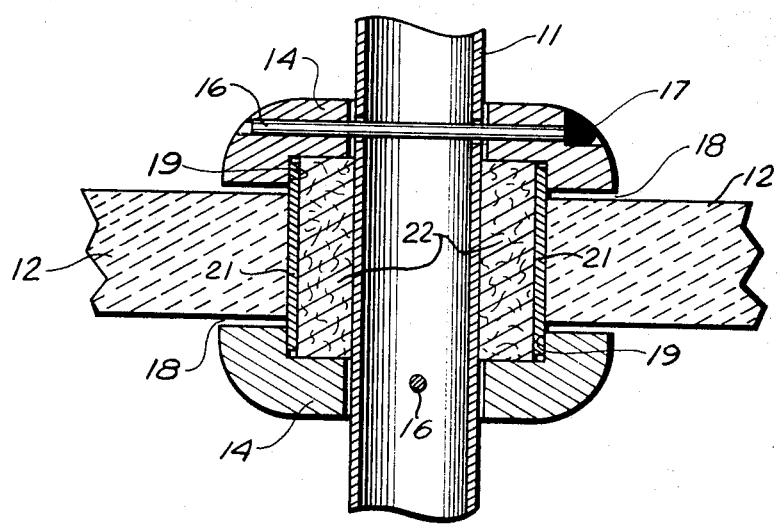
FIG. 2 illustrates in cross section one of the mounting means for the diffuser of FIG. 1.

FIGURE 2 is a cross-sectional view of one of the mounting means between a ceramic diffuser 12 and a metal support tube 11. For clarity of illustration the ceramic diffuser 12 is shown in FIG. 2 as a substantially flat element whereas it will be apparent that some curvature is actually present. As illustrated in FIG. 2 the elongated metal tube 11 passes through an aperture in the ceramic member 12 and a pair of retainer rings 14 is provided on opposite sides of the aperture. The retainers 14 are secured to the tube 11 by pins 16 loosely extending therethrough. In a preferred embodiment the pins 16 are secured in position in the retainers by a weld 17 to prevent them from working out during use of the mount. If desired, set screws can be employed in lieu of pins or less permanent securing of pins in position can be employed such as tapered pins driven into tapered holes or the like, and two or more pins may be employed for each retainer. The retainers 14 are secured to the rod like tube 11 so as to be spaced apart a distance greater than the thickness of the ceramic member 12 to provide a clearance 18 therebetween for accommodating thermal expansion.

Each of the two ring shaped retainers 14 is substantially identical and includes an internally rebated shoulder 19 having substantially the same size or diameter as the aperture through the ceramic member 12. A metal longitudinally split sleeve 21 is positioned in the aperture in the ceramic member and is longer than the thickness of the ceramic member so that it extends into the region adjacent the rebated shoulder 19 in the two retainers 14. Within the split sleeve 21 there is provided a resilient body of stainless steel felt 22 bearing on the wall of the tube 11.

A stainless steel felt preferred in the practice of this invention is a material commercially available in Type 304 stainless steel with fibers about 0.0005 inch diameter.

The short staple drawn fibers are "air-layed" by setting in a fluid to form a loose body wherein the fibers all lie substantially in parallel planes and randomly oriented within the planes. The resultant body is compressed to a desired density to form a felt-like material. The felt-like material is significantly superior to metal wool which has curled, crimped, and tangled fibers that are quite subject to breakage and which is not readily formed to completely fill a selected cavity. The felt body 22 is formed from a flat layer bent around the tube 11 with the ends merely butted together. If desired the resilient felt body 21 can be in the form of a complete ring instead of being slit longitudinally. It will also be apparent that other felt-like materials or resilient bodies can be employed.

Variations in thermal expansion between the ceramic member 12 and the metal tube 11 in a direction transverse to the tube are accommodated by the elastic compression of the stainless steel felt 22 between the tube and the sleeve. The inherent high temperature resiliency and vibration impedance of the many fibers of the felt also cushions shock loads and damps out vibration thereby further minimizing stresses on the ceramic member.

The split sleeve 21 facilitates sliding motion produced by thermal expansion differences between the ceramic element 12 and the metal tube 11 in a direction along the extent of the tube. This is the direction of greatest expansion in most instances and the sliding accommodation provides minimal stresses. Poor sliding is obtained between the metal felt and other elements and substantial loads may be applied on the ceramic in absence of the sleeve. The sleeve apparently does not slide relative to the felt, but is quite free to move relatively to the retainers and the ceramic part. In addition to providing a locus for sliding between the sleeve and the ceramic member, the sleeve provides the additional function of protecting the stainless steel felt from high temperature gas flow which, in a jet engine exhaust, is principally parallel to the surface of the ceramic member 12.

Thus, any thermal expansion differences between the metal tube and the ceramic member are resiliently accommodated by the stainless steel felt in a direction transverse to the extent of the tube and are yieldingly accommodated by sliding of the sleeve relative to the ceramic member in a direction along the extent of the tube. The felt of the mounting means illustrated in FIG. 2 provides substantial support for the ceramic member in a direction transverse to the mounting tube 11 and the plurality of orthogonally located tubes in the jet engine of FIG. 1 provides substantially rigid support for the ceramic center diffurser 12 illustrated.

Upon thermal expansion of the illustrated mounting means two changes must be accommodated, the position of the tube in the aperture shifts in a direction along the length of the tube and the diameter of the tube increases relative to the diameter of the aperture. The longitudinal shift is accommodated by sliding of the split sleeve 21 relative to the ceramic member 12, and, if necessary, relative to the retainers 14. The retainers are prevented from bearing on the ceramic by the clearance 18 which serve as a limit on the sliding motion. The radial change is accommodated by elastic compression of the metal felt body 22 between the sleeve and the tube 11. The longitudinal split in the sleeve 21 accommodates thermal expansion of the metal sleeve and prevents excessive loads from being transmitted therefrom to the ceramic. It will also be apparent that the elastic compression of the felt accommodates non-symmetrical radial changes if such should occur.

Mounting means as described and illustrated in FIGS. 1 and 2 were employed for mounting a ceramic diffuser center body in a jet engine exhaust. A ceramic diffuser body operated satisfactorily for several hours in this high stress, high temperature, high vibration environment without structural failure. In fact, in one such operation a diffuser initially cracked was installed in the jet engine and operated for several hours without further propagation of the crack, thereby demonstrating the ability of the mounting means to accommodate the thermal expansion differences of elevated temperatures and afford shock and vibration isolation for the ceramic member.

Figure 3:
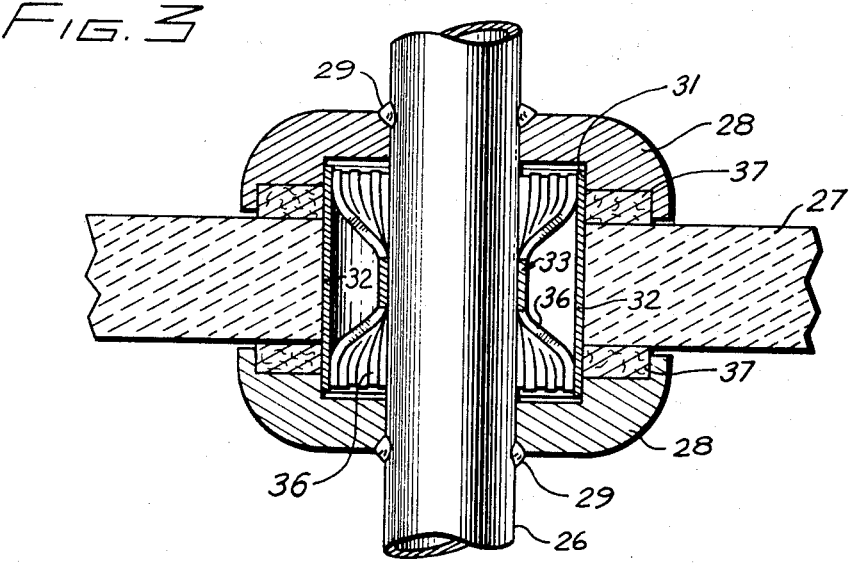
FIG. 3 illustrates another embodiment of mounting means for structures having substantial differences in thermal expansion.

In another embodiment of mounting means, as illustrated in FIG. 3, a metal support rod 26 passes through an aperture in ceramic member 27. A pair of retainers 28 are secured to the rod 26 by tack welds 29 so as to lie on opposite sides of the ceramic member 27 and provide clearance between the ceramic and the retainers. An internally rebated shoulder 31 in each of the retainer rings 28 accommodates a split sleeve 32 which passes through the aperture in the ceramic member in substantially the same manner as the sleeve 21 in the embodiment illustrated in FIG. 2.

Figure 4:
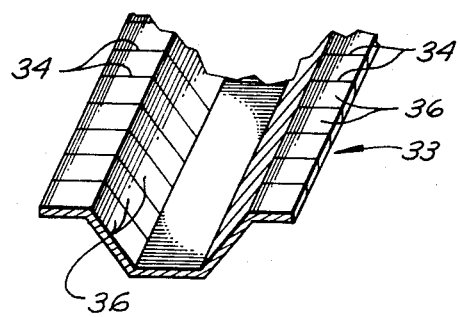
FIG. 4 illustrates a spring for use in the embodiment of FIG. 3.

In the embodiment illustrated in FIG. 3, resilient support between the sleeve 32 and the metal rod 26 is provided by an elastic compression spring 33 which is also illustrated in FIG. 4. This spring comprises a flat strip bent along its length into a broad transverse U-shape with a plurality of transversely extending slits 34, defining a plurality of transversely extending fingers 36. In use the spring is bent around the metal shaft 26 (FIG. 3) so that the fingers 36 spread slightly and bear against the surrounding sleeve 31 for providing compression support between the metal rod 26 and the ceramic member 27. Differences in thermal expansion transverse to the rod 26 are accommodated by the resilient spring 33.

Thermal expansion differences along the extent of the rod 26 are accommodated by sliding motion of the sleeve 32 relative to the ceramic member 27. Means for limited extent of sliding motion and a resilient resistance thereto is provided by two washer like bodies of stainless steel felt 37 captured between the retainer rings 28 and the ceramic member 27. In addition to elastic compression support the felt washers 37 distribute loads over an appreciable area of the ceramic to minimize stresses and also afford vibration and shock load damping.

It will be apparent to one skilled in the art that other modifications can be made in the mounting means illustrated in FIGS. 2 and 3. Thus, for example, a coil spring of oval cross section can be wrapped around the metal rod 26 for providing an elastic compression support for the sleeve 32. It is particularly preferred, however, to employ metal felt for the elastic compression member between the rod-like member and the sleeve so that the additional advantages of shock and vibration attenuation are achieved, and there is no problem of resonant frequency response. It will also be apparent that in selected embodiments a sleeve can be employed between the felt and the tube to provide a locus for sliding. Likewise a sleeve like member having a plurality of segments can be employed. It will also be apparent that in addition to mounting ceramic members such mounting means are useful in many other applications such as support for pipes carrying high temperature fluids and the like.

Obviously, many other modifications and variations of the present invention are possible in light of the above teachings. It is therefore to be understood that within the scope of the appended claims, the invention may be practiced otherwise than as specifically described.

What is claimed is:
1. Mounting means for yieldingly interconnecting a first elongated member and a second member having an aperture for receiving the first member comprising:
    a first retainer connected to said first member on one side of said second member;
    a second retainer connected to said first member on the other side of said second member, said first and second retainers being spaced from said second member for providing clearance;
    a longitudinally split sleeve slidably fitted in the aperture in said second member and at least partly surrounding said first member; and means for resiliently spacing said sleeve from said first member.

2. Mounting means as defined in claim 1 wherein said means for spacing comprises a fielt-like material between said sleeve and said first member.

3. Mounting means as defined in claim 1 wherein said means for spacing comprises a compression spring member between said sleeve and said first member.

4. Mounting means as defined in claim 1 wherein each of said first and second retainers comprises:

a ring around said first member, said ring having an internally rebated shoulder for mating with said sleeve.

5. Mounting means as defined in claim 4 wherein said means for spacing comprises a felt-like material between said sleeve and said first member.

6. Mounting means as defined in claim 4 further comprising: means for resiliently spacing each of said retainers from said second member.

7. Mounting means as defined in claim 6 wherein each of said means for spacing comprises a felt-like material.

References Cited

UNITED STATES PATENTS

| 2,813,396 | 11/1957 | Kress | 60—39.32 |
| 2,891,743 | 6/1959 | Bligard et al. | 248—5 |
| 3,073,557 | 1/1963 | Davis | 248—358 XR |

CHANCELLOR E. HARRIS, *Primary Examiner.*

J. PETO, *Assistant Examiner.*

U.S. Cl. X.R.

248—5